(12) United States Patent
Huai et al.

(10) Patent No.: US 7,639,665 B1
(45) Date of Patent: Dec. 29, 2009

(54) AUTOMATIC PROPAGATION OF CIRCUIT INFORMATION IN A COMMUNICATIONS NETWORK

(75) Inventors: Jin Huai, Petaluma, CA (US); Anix Anbiah, San Jose, CA (US); Gary Baldwin, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 644 days.

(21) Appl. No.: 10/620,021

(22) Filed: Jul. 15, 2003

Related U.S. Application Data

(62) Division of application No. 09/478,287, filed on Jan. 5, 2000, now Pat. No. 6,614,785.

(51) Int. Cl.
*H04L 12/66* (2006.01)

(52) U.S. Cl. .................... 370/352; 370/356

(58) Field of Classification Search ............... 370/242, 370/244, 241, 254, 255, 256, 257, 258, 219, 370/220
See application file for complete search history.

(56) References Cited

U.S. PATENT DOCUMENTS

| | | | |
|---|---|---|---|
| 4,644,532 A | 2/1987 | George et al. ............ 370/94 |
| 4,660,141 A * | 4/1987 | Ceccon et al. ............ 710/9 |
| 4,747,100 A | 5/1988 | Roach et al. ............ 370/452 |
| 4,858,232 A | 8/1989 | Diaz et al. ............ 370/465 |
| 4,965,790 A | 10/1990 | Nishino et al. ............ 370/437 |
| 5,042,062 A * | 8/1991 | Lee et al. ............ 348/14.11 |
| 5,093,824 A | 3/1992 | Coan et al. ............ 370/228 |
| 5,167,035 A | 11/1992 | Mann et al. ............ 714/4 |
| 5,235,599 A * | 8/1993 | Nishimura et al. ............ 714/4 |
| 5,278,824 A | 1/1994 | Kremer ............ 370/223 |
| 5,341,364 A | 8/1994 | Marra et al. ............ 370/223 |
| 5,369,653 A | 11/1994 | Kuroda ............ 371/67.1 |
| 5,390,164 A | 2/1995 | Kremer ............ 370/223 |
| 5,406,401 A * | 4/1995 | Kremer ............ 398/4 |
| 5,408,618 A | 4/1995 | Aho et al. ............ 710/104 |
| 5,412,652 A | 5/1995 | Lu ............ 370/223 |
| 5,432,789 A | 7/1995 | Armstrong et al. ............ 370/92 |
| 5,442,620 A | 8/1995 | Kremer ............ 235/462.18 |
| 5,493,689 A * | 2/1996 | Waclawsky et al. ............ 710/1 |
| 5,495,484 A | 2/1996 | Self et al. ............ 370/338 |
| 5,583,991 A | 12/1996 | Chatwani et al. ............ 395/200.01 |
| 5,586,267 A | 12/1996 | Chatwani et al. ............ 395/200.11 |

(Continued)

FOREIGN PATENT DOCUMENTS

EP  924952 A2 * 6/1999

OTHER PUBLICATIONS

Goralski, Walter J., "SONET a Guide to Synchronous Optical Networks", McGraw-Hill, 1977, Chapter 11, pp. 302-339.

(Continued)

*Primary Examiner*—Ayaz R Sheikh
*Assistant Examiner*—Mounir Moutaouakil
(74) *Attorney, Agent, or Firm*—Campbell Stephenson LLP

(57) ABSTRACT

Disclosed is a method and associated apparatus for automatically propagating circuit information in a network. In one embodiment, a network includes multiple circuit switches that are coupled using communications links. Information relating to the communications links are automatically propagated in the network using a protocol used by routers in communicating with other routers.

20 Claims, 14 Drawing Sheets

U.S. PATENT DOCUMENTS

| | | | | |
|---|---|---|---|---|
| 5,606,664 | A | | 2/1997 | Brown et al. ............. 395/200.1 |
| 5,621,721 | A | | 4/1997 | Vatuone ....................... 370/16 |
| 5,664,107 | A | | 9/1997 | Chatwani et al. ....... 395/200.54 |
| 5,715,396 | A | | 2/1998 | Chatwani et al. ....... 395/200.15 |
| 5,732,071 | A | * | 3/1998 | Saito et al. .................. 370/255 |
| 5,742,760 | A | * | 4/1998 | Picazo et al. ................ 709/249 |
| 5,781,547 | A | | 7/1998 | Wilson ....................... 370/352 |
| 5,796,736 | A | * | 8/1998 | Suzuki ....................... 370/254 |
| 5,805,568 | A | | 9/1998 | Shinbashi ................... 370/223 |
| 5,812,779 | A | * | 9/1998 | Ciscon et al. ............... 709/223 |
| 5,835,696 | A | * | 11/1998 | Hess ........................... 714/10 |
| 5,898,686 | A | * | 4/1999 | Virgile ....................... 370/381 |
| 5,928,328 | A | | 7/1999 | Komori et al. .............. 709/223 |
| 5,940,376 | A | | 8/1999 | Yanacek et al. ............. 370/250 |
| 5,949,755 | A | | 9/1999 | Uphadya et al. ............ 370/224 |
| 5,963,943 | A | | 10/1999 | Cummins et al. ............. 707/10 |
| 5,968,130 | A | * | 10/1999 | Okanoue et al. ............ 709/238 |
| 5,987,026 | A | | 11/1999 | Holland ...................... 370/353 |
| 5,999,536 | A | * | 12/1999 | Kawafuji et al. ............ 370/401 |
| 6,009,075 | A | | 12/1999 | Roberts et al. .............. 370/219 |
| 6,026,086 | A | | 2/2000 | Lancelot et al. ............ 370/353 |
| 6,094,687 | A | * | 7/2000 | Drake et al. ................. 709/241 |
| 6,122,250 | A | | 9/2000 | Taniguchi ................... 370/222 |
| 6,130,887 | A | | 10/2000 | Dutta ......................... 370/347 |
| 6,260,062 | B1 | | 7/2001 | Davis et al. ................. 709/223 |
| 6,285,192 | B1 | | 9/2001 | Bley et al. .................. 324/460 |
| 6,301,254 | B1 | | 10/2001 | Chan et al. .................. 359/115 |
| 6,347,336 | B1 | * | 2/2002 | Song et al. .................. 709/223 |
| 6,349,096 | B1 | | 2/2002 | Liu et al. .................... 370/352 |
| 6,366,556 | B1 | | 4/2002 | Ballintine et al. ........... 370/216 |
| 6,385,179 | B1 | | 5/2002 | Malcolm et al. ............ 370/329 |
| 6,389,036 | B1 | | 5/2002 | Stewart et al. .............. 370/466 |
| 6,389,119 | B1 | | 5/2002 | McBride .................. 379/93.01 |
| 6,393,472 | B1 | | 5/2002 | Anerousis et al. ........... 709/223 |
| 6,418,476 | B1 | * | 7/2002 | Luciani ....................... 709/238 |
| 6,434,140 | B1 | | 8/2002 | Barany et al. ............... 370/352 |
| 6,463,040 | B1 | | 10/2002 | Dutta ......................... 370/280 |
| 6,535,489 | B1 | * | 3/2003 | Merchant et al. ............ 370/244 |
| 6,535,529 | B1 | | 3/2003 | Ichihashi .................... 370/535 |
| 6,587,470 | B1 | | 7/2003 | Elliot et al. ................. 370/404 |
| 6,631,134 | B1 | * | 10/2003 | Zadikian et al. ......... 370/395.21 |
| 6,657,969 | B1 | | 12/2003 | Neuendorff et al. ......... 370/245 |
| 6,674,771 | B1 | | 1/2004 | Taniguchi ................... 370/505 |
| 6,731,654 | B1 | | 5/2004 | Champion et al. .......... 370/503 |
| 6,788,681 | B1 | | 9/2004 | Hurren et al. ............... 370/389 |
| 6,795,917 | B1 | | 9/2004 | Ylonen ....................... 713/160 |
| 6,847,644 | B1 | | 1/2005 | Jha ............................ 370/392 |
| 6,870,813 | B1 | | 3/2005 | Raza et al. .................. 370/238 |
| 2002/0004828 | A1 | | 1/2002 | Davis et al. ................. 709/223 |

OTHER PUBLICATIONS

Information about Tornado for Managed Switches Software from WindRiver Systems' website, www.wrs.com, 4 pages, Oct. 28, 1999.

Bellcore GR-253-CORE Issue 2, Dec. 1995, Revision 2, Jan. 1999, pp. 8-1 to 8-8, 8-31 to 8-36.

Goralski, W., *SONET: A Guide to Synchronous Optical Network*, McGraw-Hill 1997, Chapter 9, pp. 251-276.

Hari, G. and Dempsey, D., "Requirements for Bidirectional Line Switched Ring Map Generation Protocol," SONET Interoperability Forum (SIF), Contribution No. SIF-AR-9807-111, draft document, Jul. 27, 1998, pp. 1-5.

Henderson, J., "Questions on Autodiscovery of Ring Topology (SIF-AR-9804-057R2),"SONET Interoperability Forum(SIF), Contribution No. SIF-AR-9812-194, Dec. 1998, 4 pages.

Hunt, C. "BLSR Interworking—Autodiscovery of Ring Topology,"SONET Interoperability Forum (SIF), Contribution No. SIF-AR-9804-057R1, draft documents, Jun. 16, 1998, pp. 1-12.

Hunt, C. "BLSR Interworking—Autodiscovery of Ring Topology,"SONET Interoperability Forum (SIF), Contribution No. SIF-AR-9804-057R2, draft documents, Oct. 6, 1998, pp. 1-18.

Hunt, C., "BLSR Interworking—Autodiscovery of Ring Topology,"SONET Interoperability Forum (SIF), Contribution No. SIF-AR-9804-057R3, draft documents, Feb. 7, 1999, pp. 1-26.

Walsh, A., "Network Level Protection Glossary," SONET Interoperability Forum (SIF), Contribution No. SIF-IM-9805-082, May 28, 1998, pp. 1-7.

Wirbel, L., "Cerent offers a hybrid Sonet," EE Times Online, Feb. 17, 1999, (http:///www.eetimes.com/story/OEG19990217S0028), May 3, 1999, 2 pages.

Wu, L, "BLSR Interoperability Requirements—Cross Connect, Squelch Table and NUT," SONET Interoperability Forum (SIF), Contribution No. SIF-AR-9806-085, draft documents, Mar. 28, 1998, pp. 1-10.

About the Cerent 454, Cerent Corporation Web Site (http://www.cerent.com/products/cerent454.cfm), (Mar. 4, 1999), 2 pages.

Fujitsu FLM 2400 ADM Lightweight Multiplexer, Fujitsu Business Communication Systems Web Site (http://www.fbcs.com/products/sonet/2400adm.asp), (Apr. 7, 1999) 3 pages.

Black, TCP/IP and related protocols, McGraw-Hill, 1998, pp. 1, 2 and 166-169.

Neuendorff, Keith, et al., U.S. Appl. No. 10/725,709, filed Dec. 2, 2003, entitled "Generation Synchronous Transport Signal Data Used For Netwrok Protection Operation."

\* cited by examiner

| Version [0x2] | Type [0x4] | Packet Length [164] |
|---|---|---|
| Router ID [10.1.1.1] | | |
| Area ID [0x0] | | |
| Checksum | | AuthType [0x0] |
| Authentication [0x0] | | |
| Authentication [0x0] | | |
| # advertisements [0x1] | | |
| LS Age [0x0] | Options [0x40] | LSA type [0xA] |
| Opaque Type [0xCE] | Opaque ID [0x0010CF] | |
| Advertising Router [10.1.1.1] | | |
| LS Sequence Number [0x80000020] | | |
| LS Checksum | | Length [0x88] |
| Advertising Node ID [0x111A] | | |
| Neighbor Node ID [0x111B] | | |
| Advertising Interface Index [0x5] | | |
| Neighbor Interface Index [0x6] | | |
| Advertising Entity Index [0x5002] | | |
| Neighbor Entity Index [0x6002] | | |
| Flags [0xC] | | Protection Group [0x0] |
| BLSR Ring ID [0x1] | | Advertising Router BLSR Node ID [0x3] |
| Neighbor Node ID [0x111C] | | |
| Advertising Interface Index [0x6] | | |
| Neighbor Interface Index [0x6] | | |
| Advertising Entity Index [0x6002] | | |
| Neighbor Entity Index [0x6002] | | |
| Flags [0xC] | | Protection Group [0x0] |
| BLSR Ring ID [0x1] | | Advertising Router BLSR Node ID [0x3] |
| Neighbor Node ID [0x111D] | | |
| Advertising Interface Index [0x7] | | |
| Neighbor Interface Index [0x5] | | |
| Advertising Entity Index [0x7002] | | |
| Neighbor Entity Index [0x5002] | | |
| Flags [0x14] | | Protection Group [0x0] |
| BLSR Ring ID [0x2] | | Advertising Router BLSR Node ID [0x1] |
| Neighbor Node ID [0x111E] | | |
| Advertising Interface Index [0x8] | | |
| Neighbor Interface Index [0x5] | | |
| Advertising Entity Index [0x8002] | | |
| Neighbor Entity Index [0x5002] | | |
| Flags [0x14] | | Protection Group [0x0] |
| BLSR Ring ID [0x2] | | Advertising Router BLSR Node ID [0x1] |

FIG. 10A

| | | |
|---|---|---|
| Version [0x2] | Type [0x4] | Packet Length [0x6C] |
| Router ID [10.1.2.1] | | |
| Area ID [0x0] | | |
| Checksum | | AuthType [0x0] |
| Authentication [0x0] | | |
| Authentication [0x0] | | |
| # advertisements [0x1] | | |
| LS Age [0x0] | Options [0x40] | LSA type [0xA] |
| Opaque Type [0xCE] | Opaque ID [0x0010CF] | |
| Advertising Router [10.1.2.1] | | |
| LS Sequence Number [0x80000020] | | |
| LS Checksum | | Length [0x50] |
| Advertising Node ID [0x111B] | | |
| Neighbor Node ID [0x111C] | | |
| Advertising Interface Index [0x5] | | |
| Neighbor Interface Index [0x5] | | |
| Advertising Entity Index [0x5002] | | |
| Neighbor Entity Index [0x5002] | | |
| Flags [0xC] | | Protection Group [0x0] |
| BLSR Ring ID [0x1] | | Advertising Router BLSR Node ID [0x1] |
| Neighbor Node ID [0x111A] | | |
| Advertising Interface Index [0x6] | | |
| Neighbor Interface Index [0x5] | | |
| Advertising Entity Index [0x6002] | | |
| Neighbor Entity Index [0x5002] | | |
| Flags [0xC] | | Protection Group [0x0] |
| BLSR Ring ID [0x1] | | Advertising Router BLSR Node ID [0x1] |

Bracketing:
- 810B: rows Version through # advertisements
- 830B: rows LS Age through Length
- 840B: Advertising Node ID row
- 1050B.05: Neighbor Node ID [0x111C] through Advertising Router BLSR Node ID [0x1]
- 1050B.01: Neighbor Node ID [0x111A] through Advertising Router BLSR Node ID [0x1]

| | | |
|---|---|---|
| Version [0x2] | Type [0x4] | Packet Length [0x6C] |
| Router ID [10.1.5.1] | | |
| Area ID [0x0] | | |
| Checksum | | AuthType [0x0] |
| Authentication [0x0] | | |
| Authentication [0x0] | | |
| # advertisements [0x1] | | |

↑ 810C

| | | |
|---|---|---|
| LS Age [0x0] | Options [0x40] | LSA type [0xA] |
| Opaque Type [0xCE] | Opaque ID [0x0010CF] | |
| Advertising Router [10.1.5.1] | | |
| LS Sequence Number [0X80000020] | | |
| LS Checksum | Length [0x50] | |

↑ 830C

| |
|---|
| Advertising Node ID [0x111E] |

← 840C

| | |
|---|---|
| Neighbor Node ID [0x111A] | |
| Advertising Interface Index [0x5] | |
| Neighbor Interface Index [0x8] | |
| Advertising Entity Index [0x5002] | |
| Neighbor Entity Index [0x8002] | |
| Flags [0x14] | Protection Group [0x0] |
| BLSR Ring ID [0x2] | Advertising Router BLSR Node ID [0x3] |

↑ 1050C.04

| | |
|---|---|
| Neighbor Node ID [0x111D] | |
| Advertising Interface Index [0x6] | |
| Neighbor Interface Index [0x6] | |
| Advertising Entity Index [0x6002] | |
| Neighbor Entity Index [0x6002] | |
| Flags [0x14] | Protection Group [0x0] |
| BLSR Ring ID [0x2] | Advertising Router BLSR Node ID [0x3] |

| | 1110A | | | | 1110B | | | | | 1120 | |
|---|---|---|---|---|---|---|---|---|---|---|---|
| NE-1 IP Address | NE-1 Node ID | NE-1 Interface Index | NE-1 Entity Index | NE-1 BLSR Ring Node ID | NE-2 IP Address | NE-2 Node ID | NE-2 Interface Index | NE-2 Entity Index | NE-2 BLSR Ring Node ID | Working or Protect | Link Type | BLSR Ring ID |
| 1101 — 10.1.1.1 | 0x111A | 0x5 | 0x5002 | 0x3 | 10.1.2.1 | 0x111B | 0x6 | 0x6002 | 0x1 | Working | OC-12 | 0x1 |
| 1102 — 10.1.1.1 | 0x111A | 0x6 | 0x6002 | 0x3 | 10.1.3.1 | 0x111C | 0x6 | 0x6002 | 0x2 | Working | OC-12 | 0x1 |
| 1103 — 10.1.1.1 | 0x111A | 0x7 | 0x7002 | 0x1 | 10.1.4.1 | 0x111D | 0x5 | 0x5002 | 0x2 | Working | OC-48 | 0x2 |
| 1104 — 10.1.1.1 | 0x111A | 0x8 | 0x8002 | 0x1 | 10.1.5.1 | 0x111E | 0x5 | 0x5002 | 0x3 | Working | OC-48 | 0x2 |
| 1105 — 10.1.2.1 | 0x111B | 0x5 | 0x5002 | 0x1 | 10.1.3.1 | 0x111C | 0x5 | 0x5002 | 0x2 | Working | OC-12 | 0x1 |
| 1106 — 10.1.4.1 | 0x111D | 0x6 | 0x6002 | 0x2 | 10.1.5.1 | 0x111E | 0x6 | 0x6002 | 0x3 | Working | OC-48 | 0x2 |

AUTOMATIC PROPAGATION OF CIRCUIT INFORMATION IN A COMMUNICATIONS NETWORK

CROSS-REFERENCE TO RELATED APPLICATIONS

This application is a divisional of patent application Ser. No. 09/478,287, entitled "Automatic Propagation of Circuit Information in a Communications Network", filed Jan. 5, 2000 now U.S. Pat. No. 6,614,785, and naming Jin Haui, Anix Anbiah and Gary Baldwin as the inventors. This application is assigned to CISCO TECHNOLOGY, INC., the assignee of the present invention, and is hereby incorporated by reference, in its entirety and for all purposes.

CROSS-REFERENCES TO APPENDICES

The following appendices are provided in microfiche form and are incorporated herein by reference in their entirety.

Appendix A. Software Source Code, "if_pdcc.c". The total number of microfiche in Appendix A is 1. The total number of frames in Appendix A is 27.

Appendix B. Software Source Code, "os_lsd.h". The total number of microfiche in Appendix B is 1. The total number of frames in Appendix B is 5.

Appendix C. Software Source Code, "os_lsd.c". The total number of microfiche in Appendix C is 1. The total number of frames in Appendix C is 6.

Appendix D. Software Source Code, "ospfLib.c". The total number of microfiche in Appendix D is 1. The total number of frames in Appendix D is 5.

Appendix E. IETF RFC 1661, "The Point-to-Point Protocol." The total number of microfiche in Appendix E is 1. The total number of frames in Appendix E is 50.

Appendix F. "Cerent 454 User Documentation" Release 1.0. The total number of microfiche in Appendix F is 4. The total number of frames in Appendix F is 322.

Appendix G. IETF RFC 1583, "OSPF Version 2." The total number of microfiche in Appendix G is 2. The total number of frames in Appendix G is 196.

Appendix H. IETF RFC 2370, "The OSPF Opaque LSA Option." The total number of microfiche in Appendix H is 1. The total number of frames in Appendix H is 17.

Appendix I. IETF RFC 1332, "The PPP Internet Protocol Control Protocol (IPCP)." The total number of microfiche in Appendix I is 1. The total number of frames in Appendix I is 6.

Appendix J. IETF RFC 2153, "PPP Vendor Extensions." The total number of microfiche in Appendix J is 1. The total number of frames in Appendix J is 11.

Appendix K. Software Source Code, "pppvdx.c". The total number of microfiche in Appendix K is 1. The total number of frames in Appendix K is 8.

Appendix L. Software Source Code "pppvdx.h". The total number of microfiche in Appendix L is 1. The total number of frames in Appendix L is 4.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(e).

BACKGROUND OF THE INVENTION

1. Field of the Invention

This invention generally relates to communications networks and more particularly to networks having routers and circuit switches.

2. Description of the Related Art

It is well known for routers of messages (in a packet-switched network) to communicate with one another in accordance with the Open Shortest Path First ("OSPF") protocol, which is governed by a standard of the Internet Engineering Task Force ("IETF"). IETF document RFC 1583 ("IETF RFC 1583"), shown in Appendix G, describes OSPF Version 2 and is incorporated herein by reference in its entirety. IETF documents in general, including RFC 1583, are available at the IETF Internet web site. In OSPF, messages containing information about the location of various routers and interconnections among the routers (also called "network topology") are sent by the routers to one another. Each router maintains and updates a database of network topology information retrieved from such messages, which are also called "Link State Advertisements" ("LSA"). Each router uses the network topology information to determine the shortest path from itself to all other routers in the network.

The OSPF protocol has been enhanced to support a new class of LSA messages called "Opaque LSAs." Opaque LSAs are described in IETF RFC 2370, shown in Appendix H and incorporated herein by reference in its entirety. Opaque LSAs consist of a conventional LSA header followed by an information field that may be used directly by OSPF or by other applications. Implementation of Opaque LSAs provides an application interface for 1) encapsulating application-specific information in a specific opaque type, 2) sending and receiving application-specific information, and 3) if required, informing the application of the change in validity of previously received information when topological changes are detected.

SUMMARY OF THE INVENTION

This invention relates to a method and associated apparatus for automatically propagating circuit information in a network. In one embodiment, a network includes multiple circuit switches that are coupled together by communications links ("links"). Information relating to a link coupling two circuit switches is automatically propagated on the network using a protocol which is ordinarily used by routers ("packet routing protocol") in communicating with other routers. Such link related information includes identifiers assigned to the interfaces coupled by the link. Information which is automatically propagated using the packet routing protocol is used to create and maintain a table describing each operational link connecting two circuit switches. By describing a link to a level of detail which includes the interfaces coupled by the link, the table provides a detailed topology of the circuit switches in the network.

In another embodiment, a router and a circuit switch are in a single network element, the network element being part of a network. The network elements in the network are physically coupled together via the circuit switches included in each network element. Because the router and the circuit switch are in the same network element and coupling between network elements are via the circuit switches, the routers form a packet network that is implemented using the circuit switches that, in turn, form a circuit network. Information relating to the links coupling the circuit switches is automatically propagated using a packet routing protocol. Such information is also used to create and maintain a table which is included in all network elements.

In another embodiment, the links connecting the circuit switches are Synchronous Optical Network ("SONET") links and the packet routing protocol is OSPF. In one embodiment, the OSPF flooding mechanism is used to automatically propagate circuit information (as opposed to packet network type of information). Such circuit information includes a description of the interfaces coupled to a link and other information relating to the link.

BRIEF DESCRIPTION OF THE DRAWINGS

FIGS. 10A, 10B, and 10C show packets that are flooded by network elements on the network shown in FIG. 9.

FIG. 11A shows a table in accordance with the invention.

DETAILED DESCRIPTION

The present invention relates to a method and associated apparatus for automatically propagating circuit information in a network.

Figure 1:
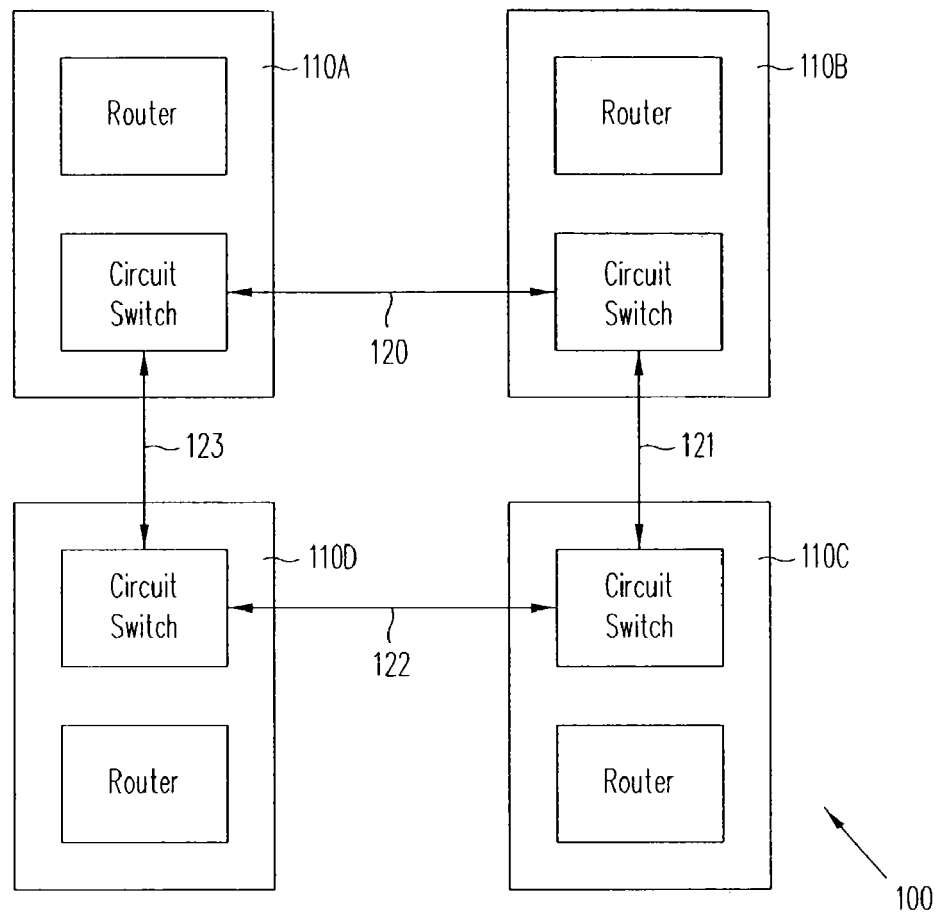
FIG. 1 shows a block diagram of a network in one embodiment of the invention.

As shown in FIG. 1, a communications network 100 includes network elements 110A, 110B, 110C, and 110D. Communications links ("links") 120-123 physically couple the circuit switches included in each network element (also known as a "node"). Each network element in network 100 also includes a router for routing packets transmitted over links 120-123 via the circuit switches. Routers and circuit switches are well known. Network element 110A, which is representative of the network elements in network 100, may be of the same type as the model 454 HIGH-SPEED SONET/SDH transport system ("Model 454") from Cisco Systems, Inc. of San Jose, Calif. "Cerent 454 User Documentation," Release 1.0, Cerent Corporation (now Cisco Systems, Inc.) April 1999, shown in Appendix F, describes the Model 454 and is incorporated herein by reference in its entirety. Network element 110A may also be of the same type as the "nodes" described in commonly-owned U.S. Pat. No. 6,657,969, "GENERATION OF DATA USED FOR NETWORK OPERATION," filed Jun. 29, 1999, incorporated herein by reference in its entirety. The just referenced patent application is hereinafter referred to as the "referenced patent application."

Figure 3A:
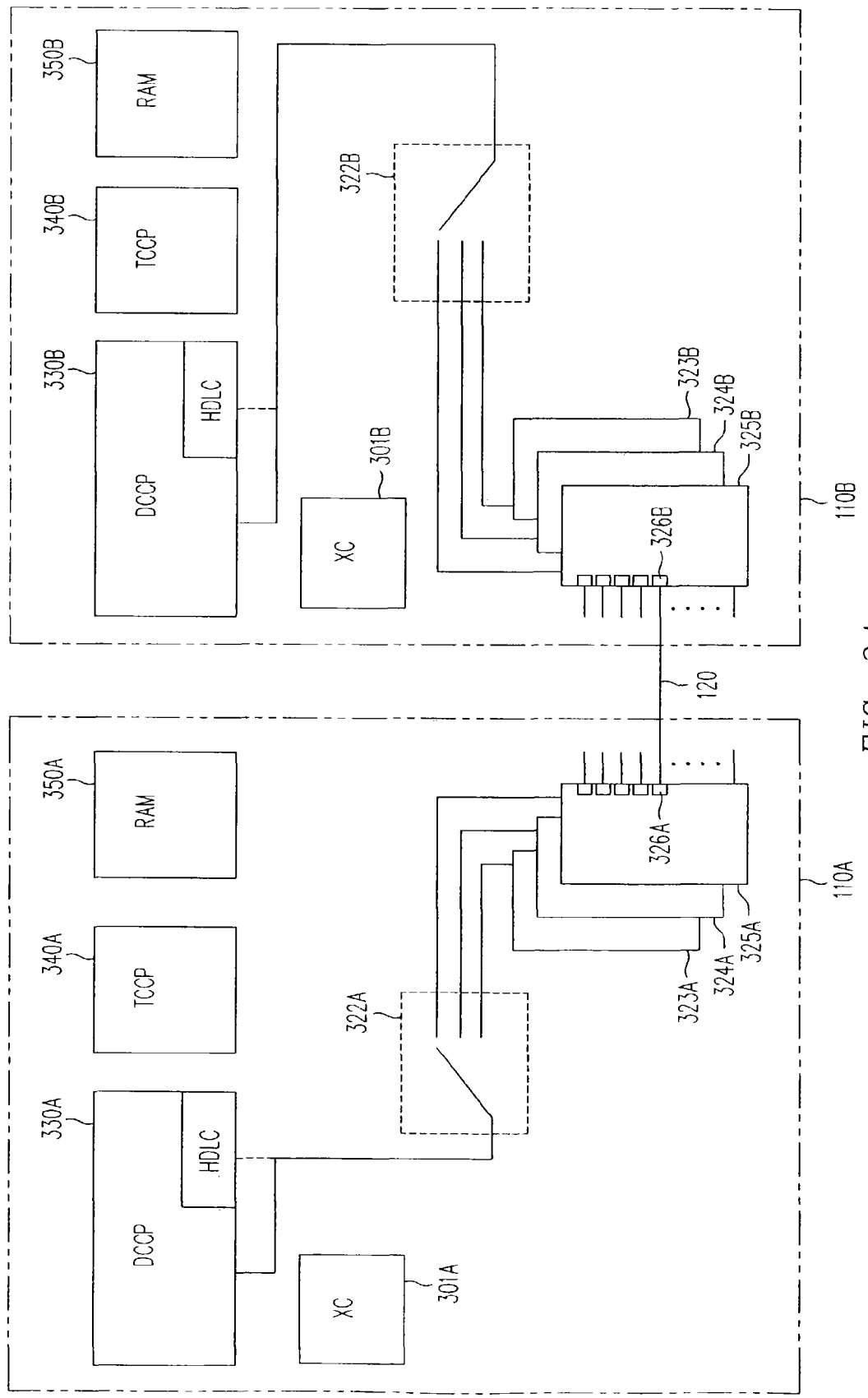
FIG. 3A shows a block diagram of network elements in one embodiment of the invention.

FIG. 3A shows a block diagram of the pertinent portions of network elements ("NE") 110A and 110B. NE 110A and NE 110B are physically coupled using a communications link such as link 120. While the following describes NE 110A, the same description also applies to NE 110B, NE 110C, and NE 110D. Link 120 connects to NE 110A through an interface (also known as "port") 326A of an interface card 325A. Interface card 325A has several interfaces to accommodate multiple links. NE 110A also has other interface cards some of which are shown in FIG. 3A as interface cards 323A and 324A. Interface cards 323A, 324A, and 325A are circuit-switch interface cards and can be of the same type used in Synchronous Optical Network ("SONET") or in SONET derivatives such as Synchronous Digital Hierarchy ("SDH"). For example, interface cards 323A, 324A, and 325A may be of the type used in the Model 454 or the "OCn" (Optical Carrier; e.g. OC-1, OC-3, etc.) cards described in the above referenced patent application. However, the invention is not so limited and may use any circuit switch interface card.

Timing Communications and Control Processor ("TCCP") 340A provides the main processing function in NE 110A. In one embodiment, TCCP 340A is an MPH850 or MPH860 POWERPC™ processor from Motorola, Inc. Data received through one of the interfaces of interface cards 323A, 324A, and 325A are provided to a Data Communications Channel Processor ("DCCP") 330A through a switch 322A. DCCP 330A provides communication processing functions such as processing of High-Level Data Link Control ("HDLC") frames using its HDLC controller. DCCP 330A can be of the type MPC860 POWERPC™ processor from Motorola, Inc. A cross-connect ("XC") card 301A switches network traffic from one interface to another interface within NE 110A. A random access memory ("RAM") 350A provides memory storage. For example, a table containing information about interface 326A and other information relating to link 120 can be stored in RAM 350A. The just described portions of NE 110A are also present in the Model 454 and are also described in the above referenced patent application.

In one embodiment, communications links 120-123, shown in FIG. 1, conform to the SONET standard. SONET is well known and is described in the American National Standards Institute ("ANSI") documents ANSI T1.105, ANSI T1.105.01, ANSI T1.105.02, ANSI T1.105.03, ANSI T1.105.04, ANSI T1.105.05, ANSI T1.105.06, ANSI T1.105.07, ANSI T1.105.08, and ANSI T1.105.09, all of which are available from ANSI; see also, W. J. Goralski, "SONET: A guide to Synchronous Optical Networks," McGraw-Hill 1997. All of the aforementioned SONET documents are incorporated herein by reference in their entirety.

Figure 12A:
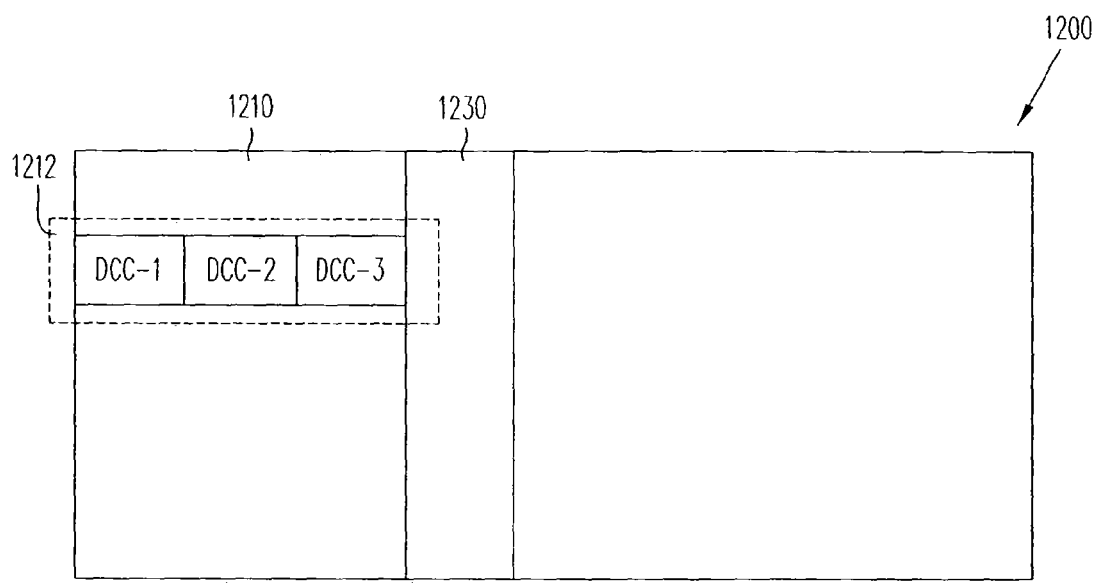
FIGS. 12A and 12B show a SONET frame as utilized in one embodiment of the invention.
Figure 12B:
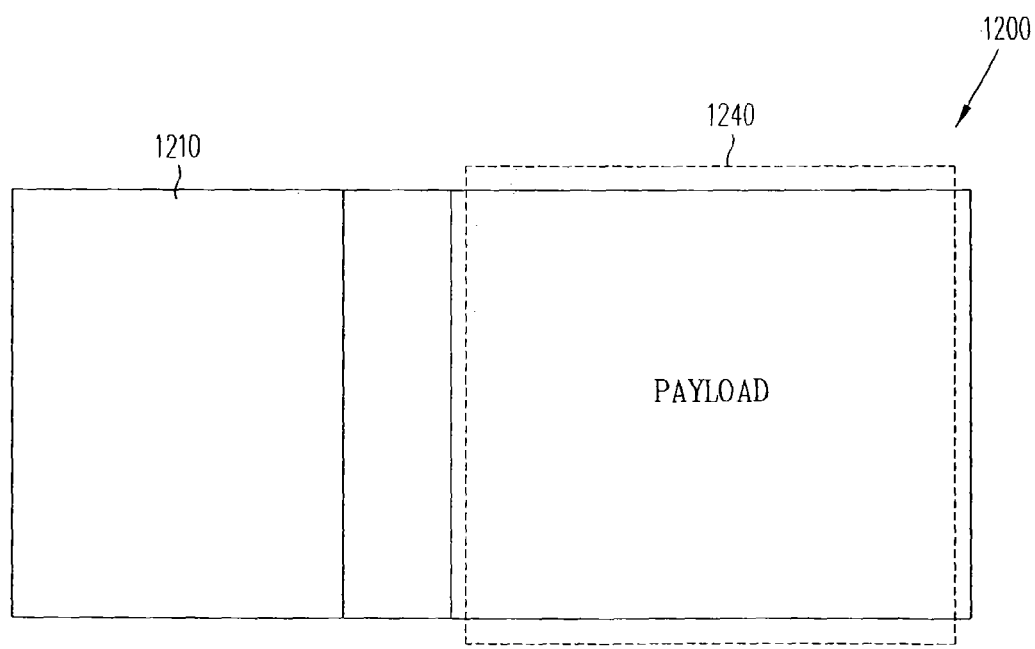

As shown in FIGS. 12A and 12B, a SONET frame 1200 is divided into three (3) sections: a transport overhead 1210, a path overhead 1230, and a payload 1240. The sections of SONET frame 1200 are further divided into sub-sections called channels, each of which can carry a byte (i.e. 8-bits) of data. Transport overhead 1210 and path overhead 1230 carry data used in the operation, administration, maintenance, and provisioning ("OAM&P") of a network (e.g. network 100). Payload 1240, as its name implies, carries user data. The channels in transport overhead 1210 and in path overhead 1230 are also referred to as out-of-band channels while channels in payload 1240 are also referred to as in-band channels.

In one embodiment, data communications channels ("DCC") of transport overhead 1210, such as DCC channels 1212 shown in FIG. 12A, are used to carry data from one network element to another. As shown in FIG. 12A, DCC channels 1212 consist of channel DCC-1, channel DCC-2, and channel DCC-3 for a total data carrying capacity of 3-bytes per frame. Referring back to FIG. 3A as an example, data can be encapsulated within an HDLC frame using the HDLC processor of DCCP 330A. The HDLC frame is then transmitted to NE 110B over link 120, which is a SONET link in this particular embodiment. HDLC frames are transmitted 3 bytes at a time to NE 110B using DCC channels 1212, resulting in a data transmission rate of 3 bytes at 8 KHZ (the standard voice transmission rate) or 192 KBPS (192 Kilo-bit per-second). HDLC frames can also be transmitted using in-band channels; this simplifies the transmission process as the HDLC frames can be transmitted in-whole or in-part using payload 1240. Of course, using in-band channels also decreases the number of channels available for user data.

Figure 3B:
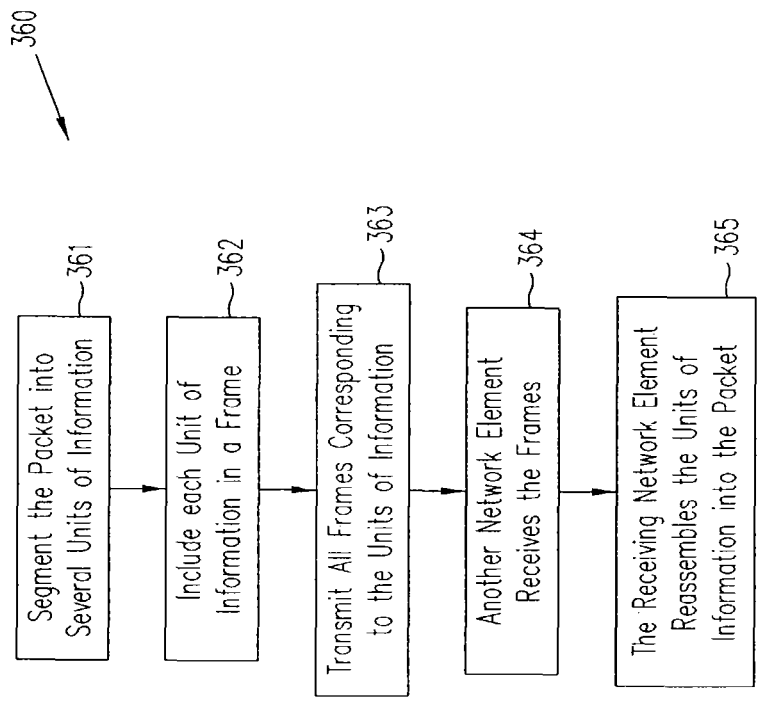
FIG. 3B shows the steps of a method for segmenting a packet for transmission using multiple frames.

FIG. 3B shows a method 360 for segmenting a packet when the transmission channels used are not wide enough to accommodate the whole packet as is the case when using DCC channels 1212. A packet is segmented (i.e. divided up) into several units (step 361, FIG. 3B). Each unit is encapsulated in a frame (step 362, FIG. 3B) and each frame is then transmitted (step 363, FIG. 3B). Another network element receives the frames (step 364, FIG. 3B), extracts the units from the frames, and reassembles the packet (step 365, FIG. 3B). When using DCC channels 1212, for example, the packet is first segmented into 3-byte units. Each 3-byte unit is carried in DCC channels 1212 of SONET frame 1200. Each SONET frame 1200 which carries the 3-byte units is received by a network element which reassembles the 3-byte units back into the packet. The segmentation process is similar when the packet is encapsulated within multiple frames. When using HDLC framing, for instance, the HDLC frame containing the packet is segmented to fit in DCC channels 1212 of SONET frame 1200.

Figure 2C:
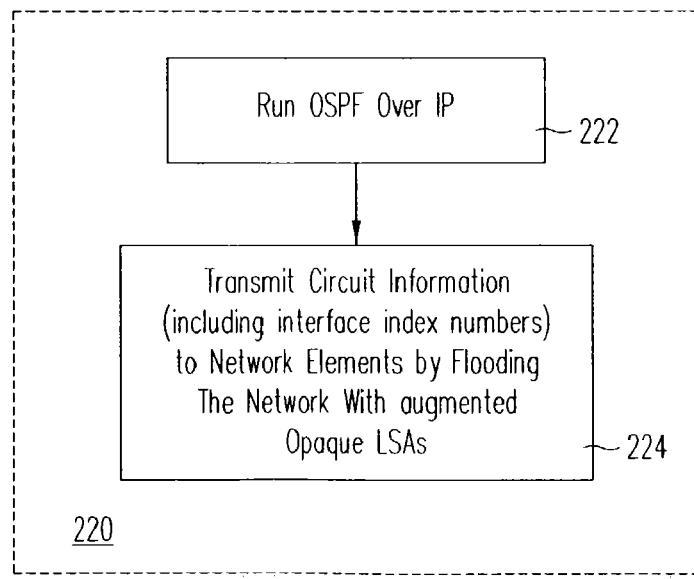
FIGS. 2A, 2B, and 2C show the steps of a method for automatically propagating network information in one embodiment of the invention.
Figures 2A, 2B:
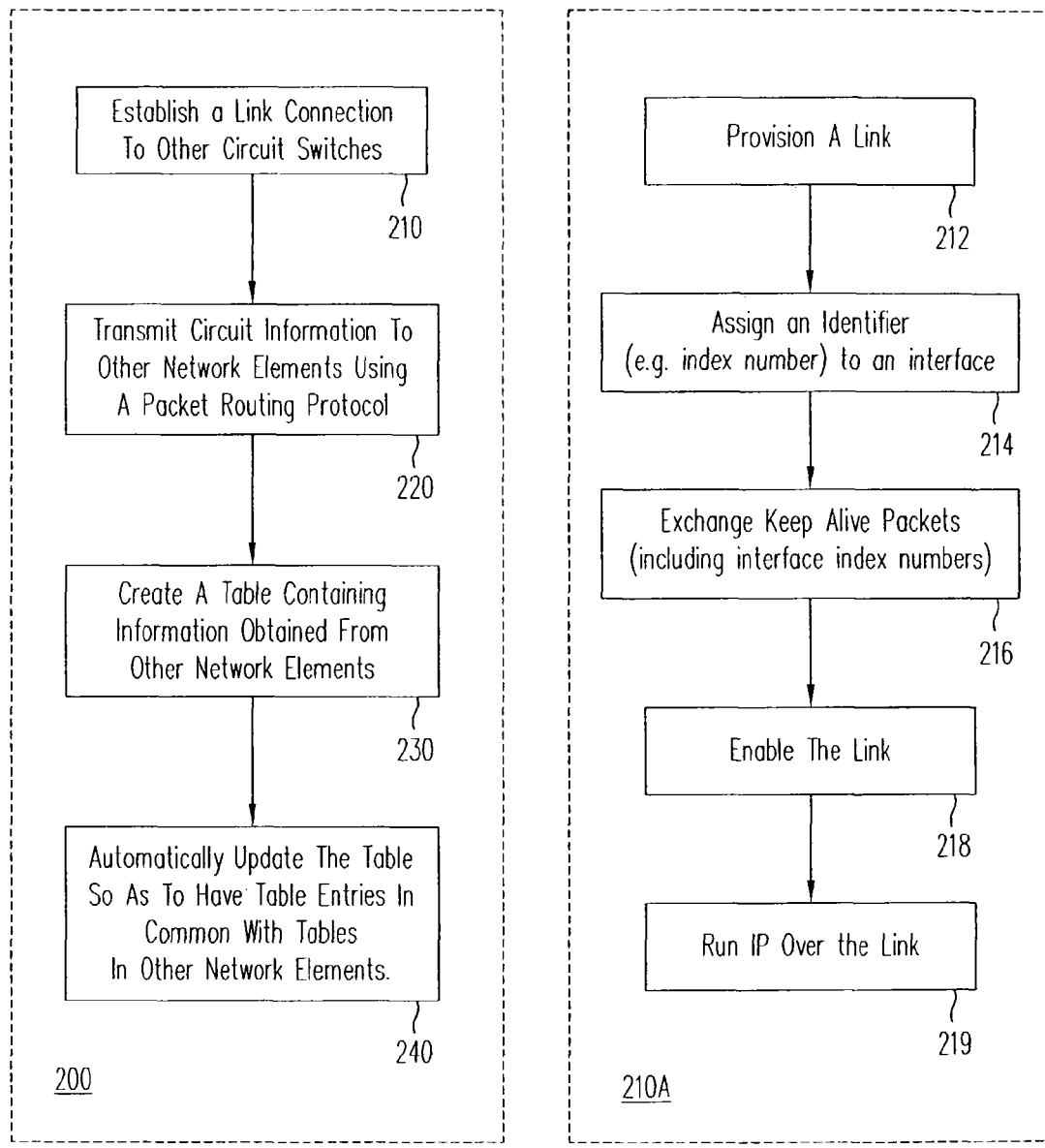

FIG. 2A shows a method 200 for automatically propagating circuit information in a network in accordance with the present invention. In step 210, a link connection is established between two circuit switches. Using NE 110A and NE 110B (FIG. 3A) as an example, step 210 involves initializing NE 110A and NE 110B such that data can be transmitted over link 120. Once a link is established between circuit switches, a routing protocol is then used to automatically transmit circuit information, such as information relating to link 120, between network elements (step 220, FIG. 2A). The information obtained from step 220 is stored as a table (step 230, FIG. 2A) in a memory location such as RAM 350A in NE 110A. The routing protocol is also used to automatically update the table in the event an obtained piece of information changes (step 240, FIG. 2A).

Figure 5:
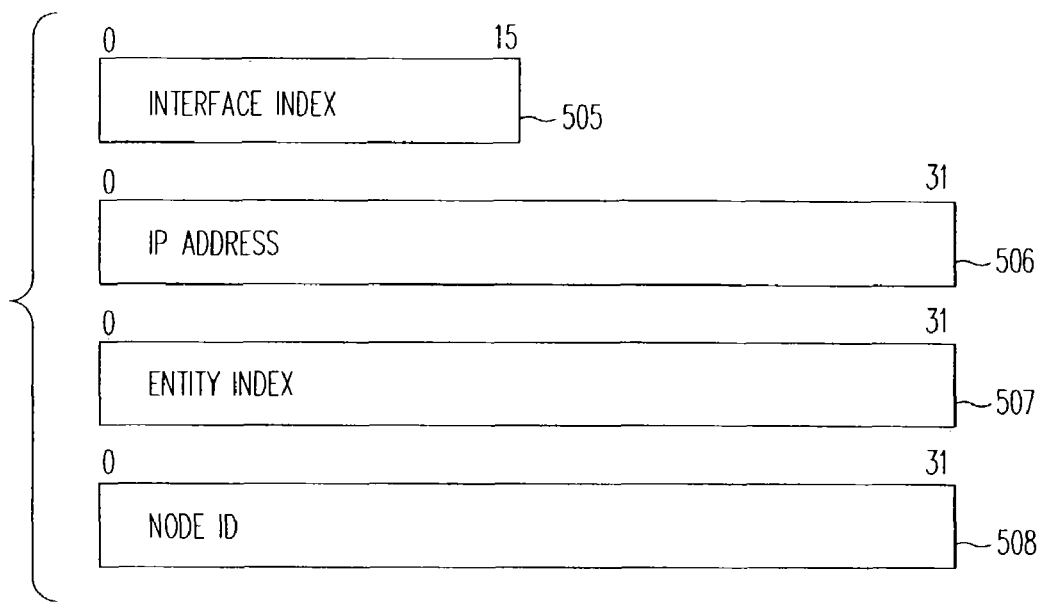
FIG. 5 shows a set of identifiers which can be used to identify an interface coupled to a link.

FIG. 2B shows a step 210A, which is one way of performing step 210. In step 212, a link is provisioned (i.e. allocated) for use by two circuit switches coupled by a link. An identifier is assigned to an interface connected to the link (step 214) so that, for example, the link and the interface can be described in a table containing information about the link. FIG. 5 shows a set of identifiers in one embodiment. Identifiers 505-508, taken together, uniquely identify an interface within a network (e.g. network 100). Identifier 505, "INTERFACE INDEX," is the logical address assigned to the interface. Identifier 505 uniquely identifies the interface within a network element and is generated by the Internet Protocol ("IP") software. By way of example, identifier 505 can be generated using an "if_attach" function, a well known function described in Wright et al., "TCP/IP Illustrated Volume II," Addison-Wesley 1995, pp. 85-92, incorporated herein by reference. Identifier 506, "IP ADDRESS," is the IP address of the network element containing the interface. Identifier 507, "ENTITY INDEX," identifies the physical location of the interface within the network element and is related to the slot location of the interface card containing the interface. For interface cards having 1024 interfaces each, the ENTITY INDEX is equal to, (Interface_card_slot_location)×1024+2+(Location_
of_interface_in_the_interface_card)

For example, the third interface of an interface card in slot location 2 has an ENTITY INDEX of 2053 (i.e. 2×1024+2+3). Identifier 508, "NODE ID," is equal to the last 4 bytes of the Medium Access Control ("MAC") address of the network element containing the interface. A MAC address is a unique physical address issued by the Institute of Electrical and Electronics Engineers (IEEE). Identifiers 505-508 uniquely identify the interface (as opposed to the network element, router, or circuit switch) within a network. This allows the creation of a table describing a network's topology to a level of detail which includes the interfaces coupled by a link.

Figure 4:
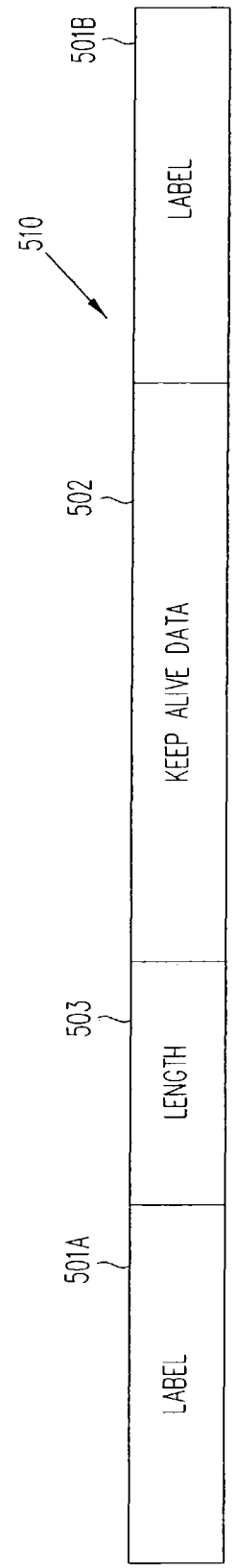
FIG. 4 shows a packet which can be used to check the status of a link.

After identifiers are assigned to the interfaces of two adjacent network elements, "keep alive packets" are exchanged between the two network elements to check if the link connecting the interfaces is properly provisioned and operational (step 216, FIG. 2B). In one embodiment, a keep alive packet 510 has a format shown in FIG. 4. Packet 510, which can be encapsulated within an HDLC frame, is transmitted using DCC channels 1212 of SONET frame 1200 at 192 KBPS. As shown in FIG. 4, a packet 510 is preceded and terminated by labels 501A and 501B. Labels 501A and 501B include a unique code for identifying packet 510 as a keep alive packet. In one embodiment, both labels 501A and 501B are set to 0x1DEADCE0 (i.e. hexadecimal 1DEADCE0) to indicate a request ("keep alive request packet"); this informs a network element on one end of a link that a network element on the other end (the network element sending the keep alive request packet) is checking if the link is operational. A network element receiving the keep alive request packet acknowledges by transmitting a packet 510 with both labels 501A and 501B set to 0x1DEADCE1 ("keep alive reply packet"). Packet 510 also includes a field 503 to indicate the length of a data field 502. Data field 502 contains keep alive data such as identifiers 505, 506, 507, and 508. Using FIG. 3A as an example, NE 110A transmits a keep alive request packet on interface 326A to check the status of link 120. The keep alive request packet from NE 110A has a data field 502 containing identifiers 505, 506, 507, and 508 for interface 326A. If link 120 is operational, NE 110B receives the keep alive request packet. Having received a keep alive request packet on interface 326B (the interface coupled to interface 326A), NE 110B determines that link 120 is operational. Further, from the data field 502 of the keep alive request packet, NE 110B determines that interface 326A of NE 110A is on the other end of link 120. NE 110B then sends an acknowledging keep alive reply packet on interface 326B. Data field 502 of the keep alive reply packet contains identifiers 505, 506, 507, and 508 for interface 326B. Because link 120 is operational, NE 110A receives the keep alive reply packet from NE 110B. From field 502 of the keep alive reply packet, NE 110A determines that interface 326B of NE 110B is on the other end of link 120. NE 110A and NE 110B continually exchange keep alive packets 510 over link 120 (also known as "polling") to determine if link 120 remains operational. If a keep alive request packet is not acknowledged with a keep alive reply packet, link 120 is deemed "down" and not used for data transmission. Because packet 510 is uniquely identified by labels 501A and 501B (and thus will not be confused with other types of packets), packet 510 can also be transmitted without HDLC framing using either in-band or out-of-band channels. HDLC framing, however, makes packet 510 less susceptible to transmission errors.

After a successful exchange of keep alive packets 510, a link connecting two network elements (via circuit switches in the network elements) is deemed "enabled" (i.e. operational) (step 218, FIG. 2B). Thereafter, IP packets are transmitted over the link using either in-band or out-of-band channels (Step 219, FIG. 2B). IP packets can be transmitted without HDLC framing by programming the network elements to treat any packet that does not contain labels 501A and 501B as an IP packet. IP packets can also be encapsulated within an HDLC frame to provide additional packet synchronization and identification. IP programming and packet encapsulation are well known; see for example, W. R. Stevens, "TCP/IP Illustrated," Volume 1 (1994) and D. Corner, "Internetworking with TCP/IP," Volume 1, all of which are incorporated herein by reference in their entirety.

Alternatively, link connection between two circuit switches (step 210, FIG. 2A) can be established in accordance with the Point-to-Point Protocol ("PPP"). PPP is well known. As described in IETF RFC 1661 (shown in Appendix E), PPP provides a Link Control Protocol ("LCP") for negotiating packet encapsulation formats, handling of varying limits on sizes of packets, and authentication protocol to be used by two network elements (which in this invention are coupled via circuit switches). Once the negotiation succeeds, the LCP so informs the PPP Network Control Protocol ("NCP"). The PPP NCP, described in IETF RFC 1332 and shown in Appendix I, establishes and configures the IP to run over PPP. The NCP also handles the exchange of IP addresses between the two network elements. Thereafter, the link coupling the two circuit switches is enabled to indicate that IP packets can be transmitted over the link. IETF RFC 2153 (shown in Appendix J) describes how PPP can be extended to include specific information not defined in the PPP standards. As used in the present invention, PPP is extended to transmit circuit information such as identifier 505 (Interface Index), identifier 507 (Entity Index), and identifier 508 (Node ID). Appendix K shows an example of a C programming language source code for extending PPP in accordance with RFC 2153 while Appendix L shows a header file which defines PPP extension data structures. In Appendix L, data structure PPP_LINK_INFO defines the Interface Index (line 10, Appendix L), Entity Index (line 11, Appendix L), and Node ID (line 9, Appendix L) for a circuit switch on one end of a link. IETF RFC 1661, IETF RFC 1332, and IETF RFC 2153 are incorporated herein by reference in their entirety.

Figure 6A:
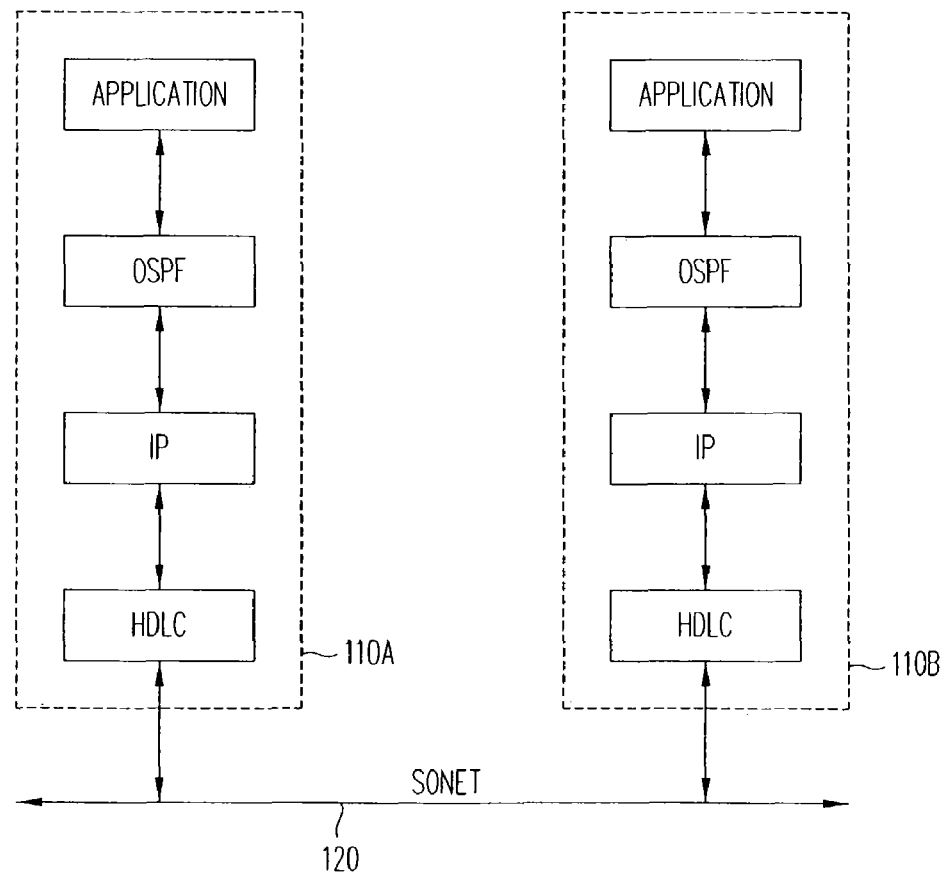
FIG. 6A shows a software layering model in one embodiment of the invention.
Figure 6B:
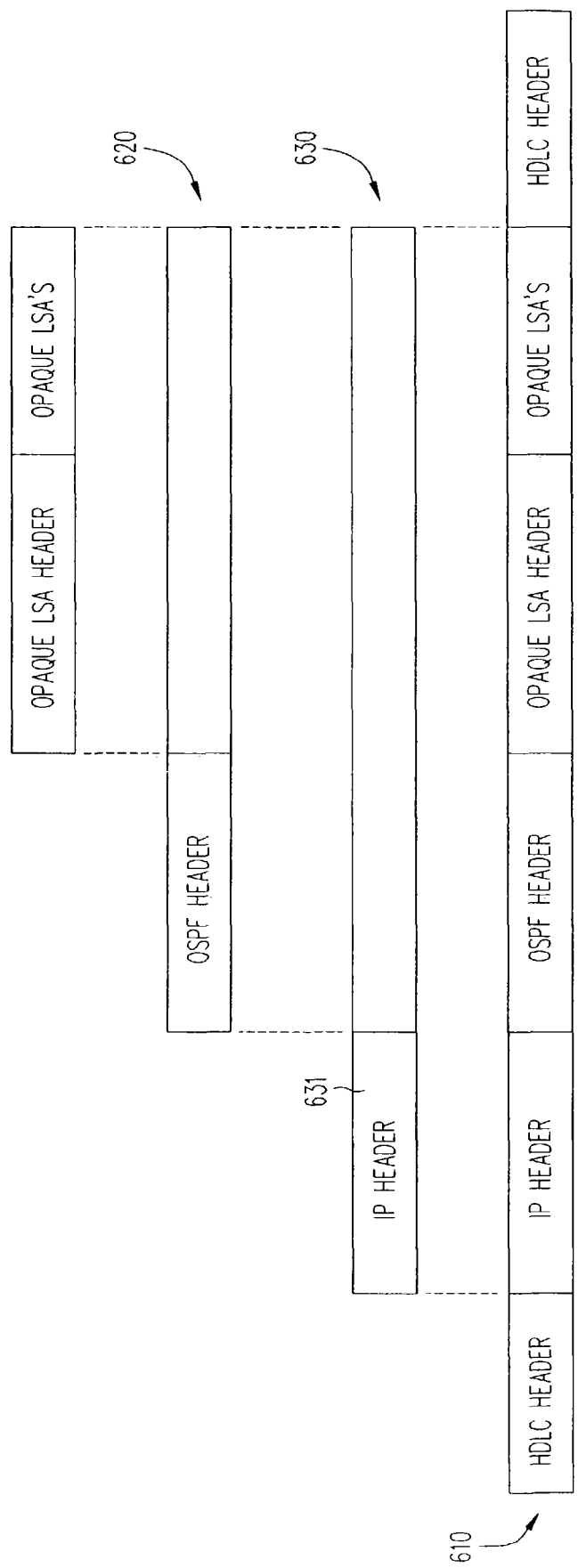
FIG. 6B shows, in graphical form, the encapsulation of packets in one embodiment of the invention.

The layering model of an embodiment of the invention is illustrated in FIG. 6A using NE 110A and NE 110B (FIG. 3A) as an example. On the lowest layering level, or what is commonly known as the physical layer, a SONET link 120 couples NE 111A and NE 110B. The HDLC protocol is used as a link layer to encapsulate packets from overlying layering levels for transmission over link 120. FIG. 6B graphically summarizes the encapsulation of IP, OSPF, and Opaque LSA packets into an HDLC frame 610. OSPF packet 620 is encapsulated directly within an IP packet 630 by assigning a value of 0x59 in the Protocol field of a header 631 of IP packet 630. As discussed above, IP packet 630 can also be transmitted without HDLC framing by directly placing IP packet 630 in in-band or out-of-band channels of a SONET frame.

FIG. 2C shows a method for transmitting circuit information (step 220, FIG. 2A) in one embodiment of the invention. Once IP is running on an operational link coupling two circuit switches, OSPF can then be run over IP (step 222, FIG. 2C). This is graphically illustrated in FIG. 6B wherein IP packet 630 encapsulates OSPF packet 620. Circuit information is transmitted to network elements using standard OSPF flooding mechanisms (step 224, FIG. 2C). In one embodiment, the OSPF protocol software is the TORNADO FOR MANAGED SWITCH™ software package from Wind River Systems, Inc. of Alameda, Calif. Other OSPF protocol software can also be used.

As described in IETF RFC 1583 (pp. 5-8, IETF RFC 1583), OSPF is classified as an Interior Gateway Protocol ("IGP"). This means that OSPF distributes routing information between routers belonging to an autonomous network (i.e. a group of routers exchanging routing information via a common routing protocol; also referred to in IETF RFC 1583 as an Autonomous System). OSPF has been designed by the OSPF working group of IETF expressly for the TCP/IP Internet environment. OSPF routes IP packets based solely on the destination IP Address and IP Type of service found in the IP packet header. OSPF is a dynamic routing protocol. It quickly detects topological changes in the autonomous network. Each router in the autonomous network maintains a database describing the autonomous network's topology. Each participating router has an identical database. Each individual piece of this database is a particular router's local state (e.g., the router's usable interfaces and reachable neighbors). The router distributes its local state throughout the autonomous network using a process referred to as "flooding" (transmitting or advertising router information to participating routers in the autonomous network). In OSPF, neighbor relationships are established and maintained using the Hello Protocol of OSPF (pp. 45-47, IETF RFC 1583). The topological databases in each of the routers remain identical and synchronized by exchanging link state advertisements ("LSA") describing the databases (pp. 46-47, IETF RFC 1583). As described in IETF RFC 2370, a class of LSAs referred to as "Opaque LSA" allows the flooding of application-specific information. Standard OSPF link state flooding mechanisms are used to distribute Opaque LSAs to participating routers (pp. 1-2, IETF RFC 2370).

In one embodiment, a protocol which routers ordinarily use in communicating with one another (i.e. a packet routing protocol) is used to automatically discover and propagate information relating to a link connecting two circuit switches. While the invention is illustrated using OSPF and an augmented OSPF Opaque LSA, other packet routing protocols can also be used including the so-called Routing Information Protocol ("RIP") and the IGRP protocol used by Cisco Systems, Inc. of San Jose, Calif.

Figure 8:
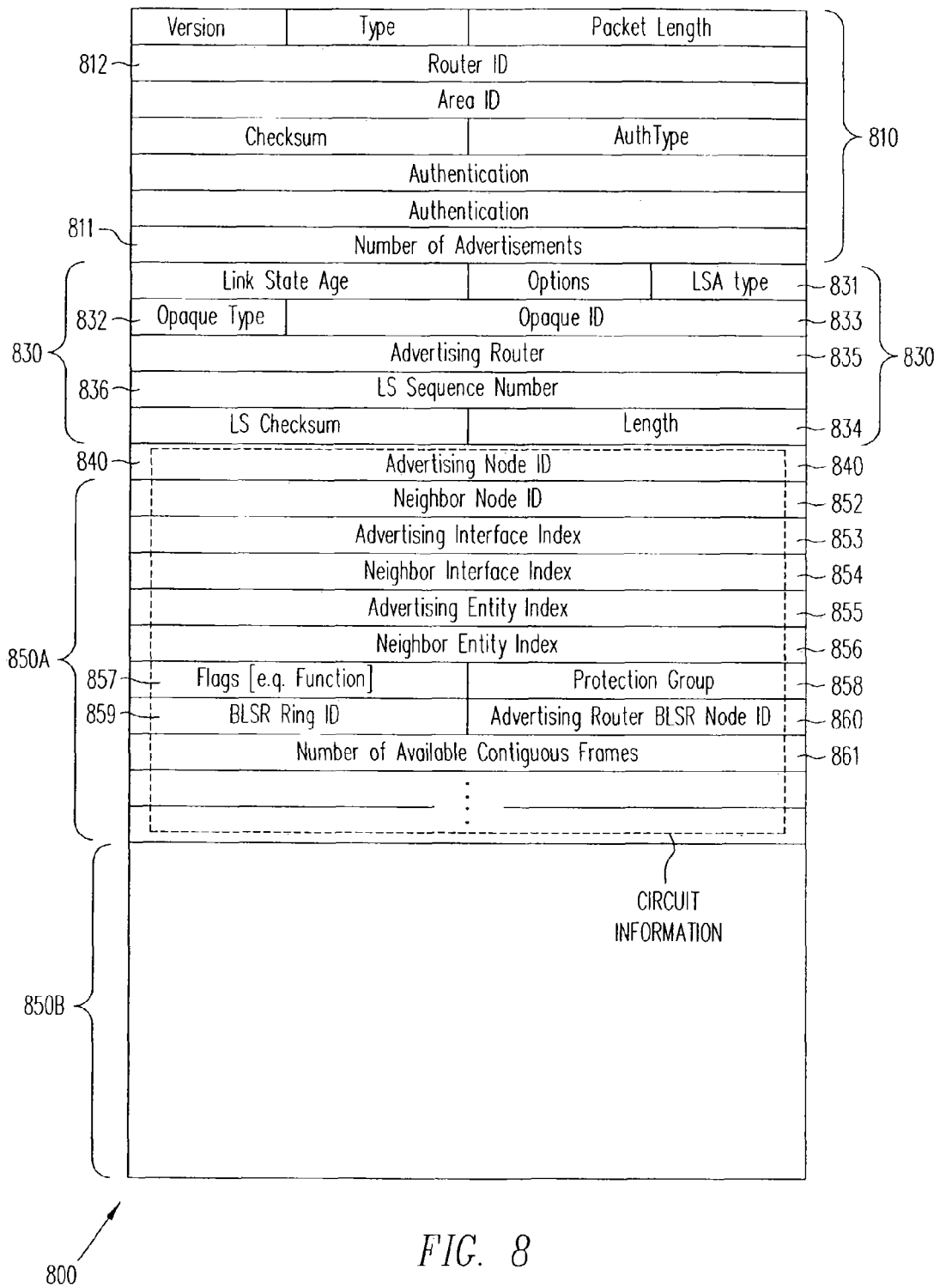
FIG. 8 shows a packet in one embodiment of the invention.

FIG. 8 shows a packet 800 in accordance with an embodiment of the invention. Packet 800 includes words 810, words 830, field 840, and words 850 (i.e. words 850A, 850B . . . ). Words 810 compose a standard OSPF Link State Update packet header (p. 179, IETF RFC 1583). Words 850A contain information relating to a link while words 850B contain information relating to another link. Additional words 850 containing information relating to other links coupling other circuit switches can be appended on packet 800. The number of link advertisements following words 810 is indicated in field 811, referred to in IETF RFC 1583 as "# advertisements" (p. 179, IETF RFC 1583). In an embodiment, field 811 has a value 0x1 because the fields following field 811 are all part of a single Opaque LSA. Field 812, referred to as "Router ID" in IETF RFC 1583 (pp. 171-172, 179, IETF RFC 1583), contains the IP Address (identifier 506, FIG. 5) of the network element transmitting the packet 800.

Words 830, shown in FIG. 8, compose a standard Opaque LSA header as described in IETF RFC 2370 (pp. 12-14, IETF RFC 2370). Words 830 include fields 831-836. Field 831 (LSA type) is set to 0xA to indicate that packet 800 contains an Opaque LSA. In one embodiment, field 832 (Opaque Type) and field 833 (Opaque ID) are set to 0xCE and 0x0010CF, respectively, to indicate that packet 800 contains information in accordance with the present invention. Network elements which do not utilize the invention will not recognize the settings of fields 832-833 and, accordingly, will ignore packet 800. Field 835 (Advertising Router) contains the IP Address of the network element transmitting packet 800.

In accordance with the invention, field 840 contains the Node ID (identifier 508, FIG. 5) of the advertising network element. As used in this disclosure, the advertising network element ("advertising NE") is the network element that transmits a packet 800 over a link and to its neighboring network element ("neighbor NE") on the other end of the link. Words 850A, which include fields 852-861, contain information relating to a link coupled to an interface of the advertising NE. Field 852 (Neighbor Node ID) contains the Node ID of the neighbor NE coupled to the advertising NE. Field 853 (Advertising Interface Index) contains the Interface Index (identifier 505, FIG. 5) of the interface used by the advertising NE to transmit the packet 800 while field 854 (Neighbor Interface Index) contains the Interface Index of the corresponding interface used by the neighbor NE. Similarly, field 855 (Advertising Entity Index) contains the Entity Index (identifier 507, FIG. 5) of the interface used by the advertising NE while field 856 contains the Entity Index of the corresponding interface used by the neighbor NE.

Fields 857-861 contain additional information about the link identified by fields 840, 852-856 ("identified link"). In an embodiment of the invention, fields 857-861 contain the attributes of a SONET link. Field 857 (Flags) has sixteen (16) bits, of which only the last five (5) bits are used. The last lowest two bits of field 857 indicate the SONET protection type of the identified link: "0" for a 2-fiber Bi-Directional Line-Switched Ring ("BLSR"); "1" for a One Plus One ("1+1"); "2" for Virtual Tributary ("VT") Tunnel; and "3" for no protection. The next higher bit of field 857 indicates the protection role of the identified link (i.e. the function of the identified link in the circuit network): a "0" indicates that the identified link is a protection link whereas a "1" indicates that the identified link is a working link. The next higher two bits indicate whether the identified link is an OC-3 ("0"), an OC-12 ("1"), an OC-48 ("2"), or an OC-192 ("3"). Field 858 (Protection Group) indicates the SONET protection group to which the identified link belongs. Field 859 (BLSR Ring ID) indicates the BLSR ring to which the identified link belongs while field 860 (Advertising Router BLSR Node ID) indicates the BLSR Node ID of the advertising NE in the BLSR Ring identified in field 859. Note that a network element can belong to multiple BLSR rings. Fields 859 and 860 are not used for non-BLSR rings.

Figure 7:
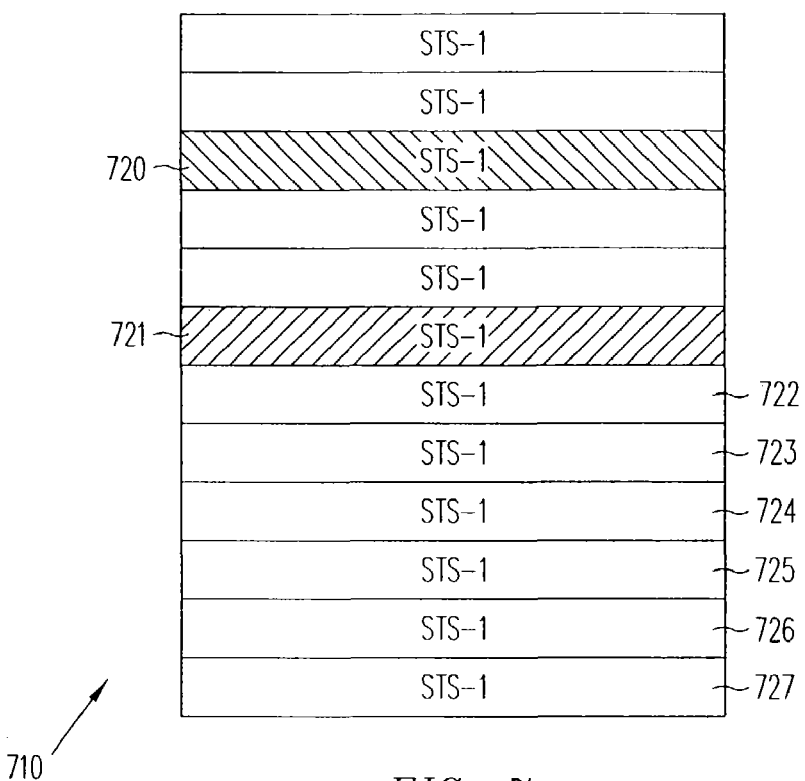
FIG. 7 shows, in graphical form, a SONET STS-12 frame.

Field 861 (Number of Available Contiguous Frames) indicates the maximum available contiguous SONET frames and the granularity (e.g. VT 1.5, STS-1, STS-3, STS-12, STS-48, etc.) of each frame on the identified link. A SONET frame within a larger frame (such as STS-1 frames in an STS-3 frame) is also referred to as a "path." In FIG. 7, a SONET STS-12 710 has 12 STS-1's wherein only STS-1 720 and STS-1 721 are being used to carry network traffic over the identified link. Thus, the maximum available contiguous frames for STS-12 710 is defined by STS-1 722 through 727 (i.e. six contiguous frames, each frame having an STS-1 granularity).

Additional words containing circuit information such as other information about a link coupling two circuit switches can be appended on packet 800. Of course, some of the fields of packet 800 shown in FIG. 8 can be omitted to suit specific applications.

In accordance with the invention, information relating to a link coupling two circuit switches is automatically discovered and propagated using OSPF flooding mechanisms to exchange packets 800 between network elements. Table 1 below references C programming language source codes used with the aforementioned OSPF protocol software from Wind River Systems, Inc. in one embodiment of the invention. The source codes listed in table 1 are for a specific embodiment and are provided herein solely as an additional example of the invention. Other OSPF protocol software can also be used to practice the invention.

TABLE 1

| CODE | COMMENTS |
| --- | --- |
| if_pdcc.c (Appendix A) | Driver module for receiving/sending data over SONET DCC channels. |
| os_lsd.h (Appendix B) | A header file defining data structures and variables. "#ifdef OPQ_LSA" sections (e.g., see lines 31-38, Appendix B) include lines of codes for supporting an augmented Opaque LSA in accordance with the invention (e.g. packet 800). "CERENT_OPQ" (line 33, Appendix B), which is set to 0xCE0010CF, indicates that the Opaque LSA is in accordance with the invention. CERENT_OPQ is stored in fields 832 and 833 (FIG. 8) (i.e. concatenation of Opaque Type and Opaque ID). Data structure type "OPQ10_link" defines fields 840, 852-858 (FIG. 8) in lines 42-49 of Appendix B, respectively (i.e. field 840 is "myNodeId[4]", field 852 is "nbrNodeId[4]", field 853 is "myIfIndex[4]", etc.). Fields 859-861, which are not implemented in this particular embodiment, can be similarly defined. |
| os_lsd.c (Appendix C) | This module builds an augmented Opaque LSA in accordance with the invention. |
| ospfLib.c (Appendix D) | Routine "ospfFillOpq" (lines 5-44, Appendix D) uses routines from if_pdcc.c (Appendix A) to get information from an augmented Opaque LSA in accordance with the invention. If the received augmented Opaque LSA information indicates that information relating to a link has changed, routine "ospfNotify" (lines 51-59, Appendix D) informs the OSPF protocol software of the change. |

Figure 9:
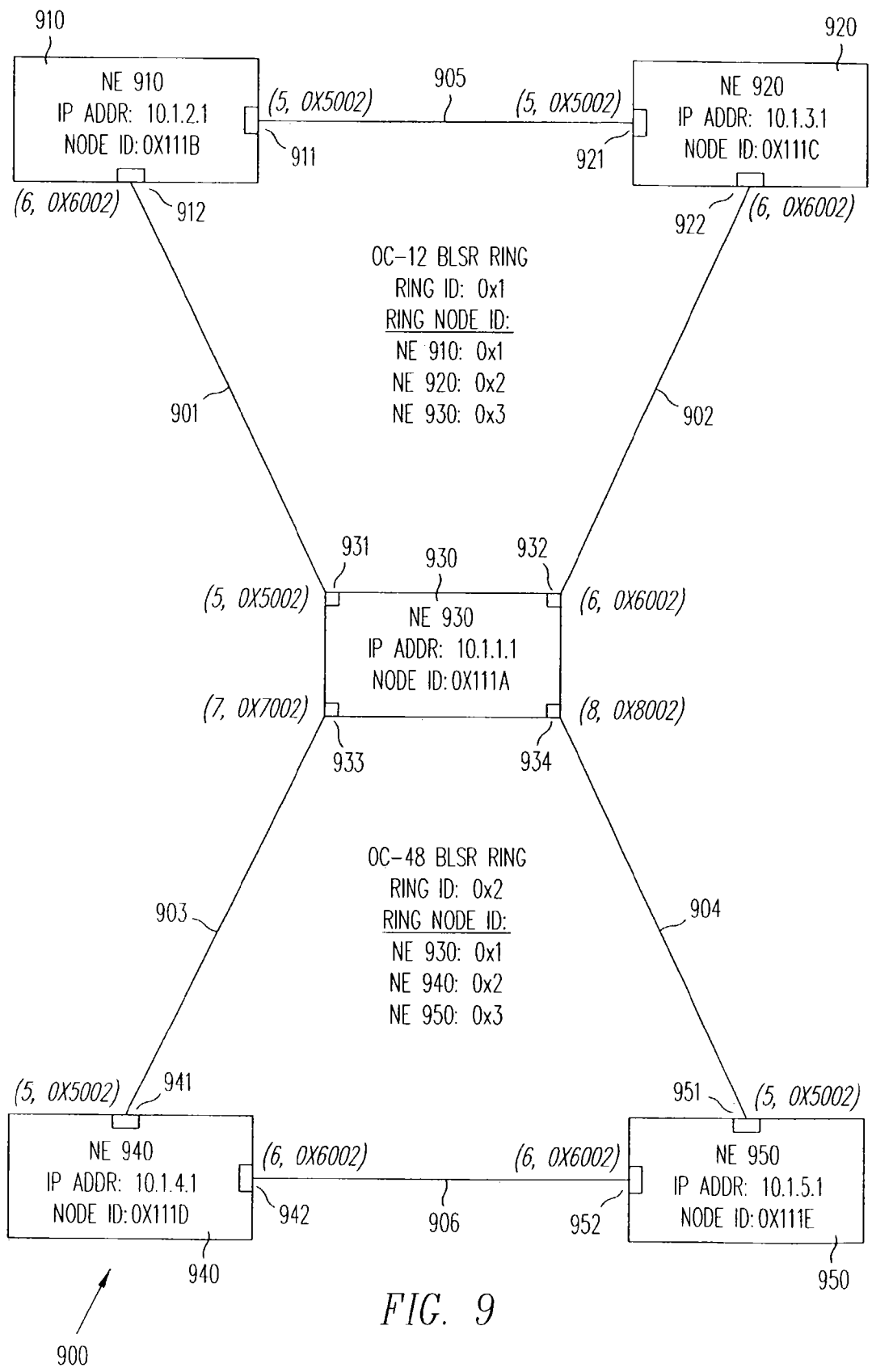
FIG. 9 shows a block diagram of a network in one embodiment of the invention.

An embodiment of the invention is now illustrated using network 900, shown in FIG. 9, as an example. NE 910, NE 920, NE 930, NE 940, and NE 950 are network elements similar to NE 110A (FIG. 1). Network 900 includes communications links 901-906 which are SONET links in this embodiment:

link 901 couples an interface 912 of NE 910 to an interface 931 of NE 930;

link 902 couples an interface 922 of NE 920 to an interface 932 of NE 930;

link 903 couples an interface 933 of NE 930 to an interface 941 of NE 940;

link 904 couples an interface 934 of NE 930 to an interface 951 of NE 950;

link 905 couples an interface 911 of NE 910 to an interface 921 of NE 920; and link 906 couples an interface 942 of NE 940 to an interface 952 of NE 950.

NE 910, NE 920, and NE 930 form a SONET OC-12 BLSR ring having a BLSR ring ID (field 859, FIG. 8) of 0x1. In the SONET ring with BLSR ring ID 0x1, NE 910, NE 920, and NE 930 have BLSR Node IDs (field 860, FIG. 8) of 0x1, 0x2, and 0x3, respectively. NE 930, NE 940, and NE 950 form a SONET OC-48 BLSR ring having a BLSR Ring ID of 0x2. In the SONET BLSR ring with BLSR Ring ID of 0x2, NE 930, NE 940, and NE 950 have BLSR Node IDs of 0x1, 0x2, and 0x3, respectively. Table 2 below contains a description of network 900. In table 2, "IP Address" refers to identifier 506 (FIG. 5), "Node ID" refers to identifier 508, "Interface Index" refers to identifier 505, and "Entity Index" refers to identifier 507.

TABLE 2

| NE 910 | |
|---|---|
| IP Address: | 10.1.2.1 |
| Node ID: | 0x111B |
| Interface 911, Interface Index: | 0x5 |
| Interface 911, Entity Index: | 0x5002 |
| Interface 912, Interface Index: | 0x6 |
| Interface 912, Entity Index: | 0x6002 |
| NE 920 | |
| IP Address: | 10.1.3.1 |
| Node ID: | 0x111C |
| Interface 921, Interface Index: | 0x5 |
| Interface 921, Entity Index: | 0x5002 |
| Interface 922, Interface Index: | 0x6 |
| Interface 922, Entity Index: | 0x6002 |
| NE 930 | |
| IP Address: | 10.1.1.1 |
| Node ID: | 0x111A |
| Interface 931, Interface Index: | 0x5 |
| Interface 931, Entity Index: | 0x5002 |
| Interface 932, Interface Index: | 0x6 |
| Interface 932, Entity Index: | 0x6002 |
| Interface 933, Interface Index: | 0x7 |
| Interface 933, Entity Index: | 0x7002 |
| Interface 934, Interface Index: | 0x8 |
| Interface 934, Entity Index: | 0x8002 |
| NE 940 | |
| IP Address: | 10.1.4.1 |
| Node ID: | 0x111D |
| Interface 941, Interface Index: | 0x5 |
| Interface 941, Entity Index: | 0x5002 |
| Interface 942, Interface Index: | 0x6 |
| Interface 942, Entity Index: | 0x6002 |
| NE 950 | |
| IP Address: | 10.1.5.1 |
| Node ID: | 0x111E |
| Interface 951, Interface Index: | 0x5 |
| Interface 951, Entity Index: | 0x5002 |
| Interface 952, Interface Index: | 0x6 |
| Interface 952, Entity Index: | 0x6002 |

In accordance with the invention, each network element in network 900 floods the network with packets 800 describing interfaces that are coupled to operational links. FIG. 10A shows a packet 800A that is flooded onto network 900 by NE 930 using standard OSPF link state flooding mechanisms. Packet 800A contains information relating to all operational links coupled to all interfaces of NE 930. In packet 800A and other packets shown in FIGS. 10B and 10C, values appearing in brackets indicate the contents of a field adjacent to the bracketed value. In packet 800A (FIG. 10A), for example, field 812A (Router ID) has a value of "10.1.1.1", which is the IP Address of NE 930. Note that field 811A (# advertisements) has a value of 0x1 because all the fields following field 811A compose a single (i.e. one) LSA. Words 810A have the same fields as words 810. Similarly, words 830A have the same fields as words 830. Field 835A (Advertising Router) contains the IP Address of NE 930 which is "10.1.1.1". Field 840A (Advertising Node ID) contains the Node ID of NE 930 (the advertising NE), which is "0x111A." Words 1050A.01, 1050A.02, 1050A.03, and 1050A.04 contain information relating to operational links coupled to the interfaces of NE 930. Words 1050A.01 contain information relating to link 901, the link that couples interface 931 of NE 930 to interface 912 of NE 910. Fields 852A.01, 853A.01, 854A.01, 855A.01, 856A.01, 857A.01, 858A.01, 859A.01, and 860A.01 are the same as fields 852-860, respectively, of packet 800 (FIG. 8). Field 861 is not implemented in this particular embodiment. Field 852A.01 contains "0x111B", which is the Node ID of NE 910 (the neighbor of NE 930 over link 901). Field 853A.01 contains "0x5", the interface index of interface 931 (the interface of NE 930 coupled to link 901). Similarly, field 854A.01 contains "0x6", which is the interface index of interface 912 (the interface of NE 910 coupled to link 901). Fields 855A.01 and 856A.01 contain the Entity Index of interface 931 and Entity index of interface 912, respectively. Field 857A.01 has a value of "0xC" which is equal to "0000 0000 0000 1100" in binary notation. This indicates that link 901 is a 2-fiber BLSR link (" . . . 11<u>00</u>"; see description of field 857 above), is a working link (" . . . 1<u>1</u>00"), and an OC-12 (" . . . 0 <u>1</u>100"). The value "0x0" in field 858A.01 indicates that link 901 does not belong to a protection group. Field 859A.01 contains the Ring ID of the BLSR ring to which link 901 belongs. In this case, link 901 is part of the SONET OC-12 BLSR ring formed by NE 930, NE 910, and NE 920; field 859A.01 contains "0x1", the ring ID of the just mentioned OC-12 BLSR ring. Field 860A.01 contains "0x3", the BLSR Node ID of NE 930 in the BLSR ring formed by NE 930, NE 910, and NE 920. Similarly, words 1050A.02, 1050A.03, and 1050A.04 contain information relating to links 902, 903, and 904, respectively.

FIG. 10B shows a packet 800B, which is flooded onto network 900 by NE 910 using OSPF link state flooding mechanisms. Words 1050B.05 contain information relating to link 905, which couples interface 911 of NE 910 to interface 921 of NE 920, while words 1050B.01 contain information relating to link 901, which couples interface 912 of NE 910 to interface 931 of NE 930. FIG. 10C shows an exemplary packet 800C flooded by NE 950 onto network 900. In packet 800C, words 1050C.04 and 1050C.06 contain information relating to links 904 and 906 respectively.

Figure 11B:
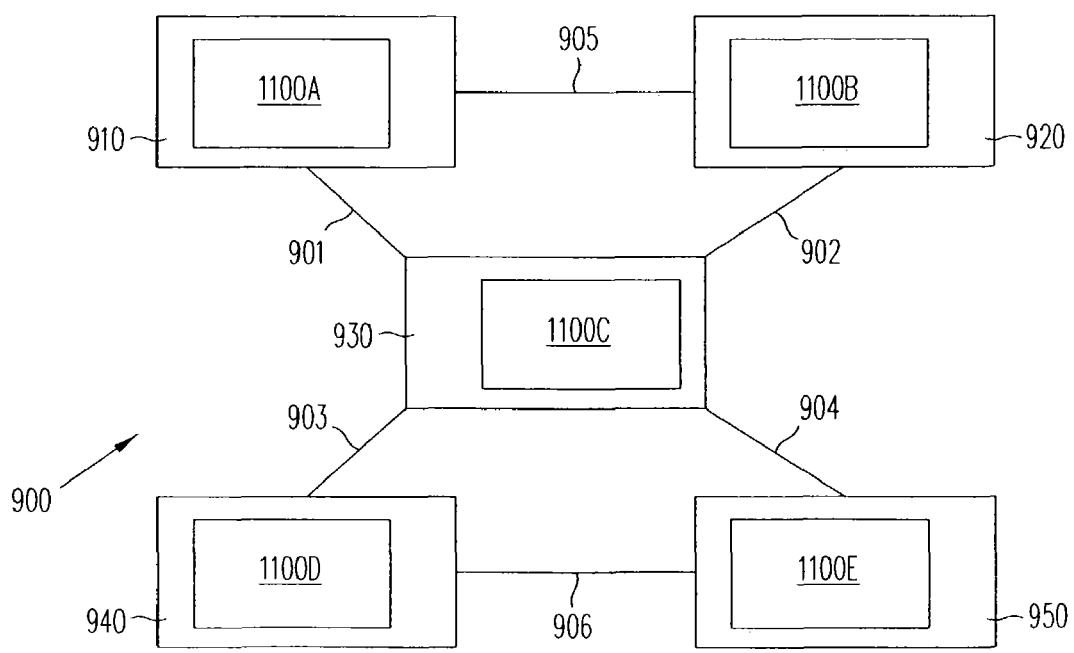
FIG. 11B shows the table shown in FIG. 11A included in all network elements of the network shown in FIG. 9.

The flooding of packets 800 (e.g. 800A, 800B, and 800C) by each network element in network 900 using OSPF flooding mechanisms allows for the creation of a table containing information about each operational link in network 900. After NE 910, NE 920, NE 930, NE 940, and NE 950 have flooded network 900 with packets 800, a table, such as a table 1100 shown in FIG. 11A, can be created and maintained in each network element. As shown in FIG. 11B, NE 910, NE 920, NE 930, NE 940, and NE 950 contain tables 1100A, 1100B, 1100C, 1100D, and 1100E having the same type of information as table 1100. In table 1100, "NE-1" and "NE-2" refer to two network elements coupled by a link. For example, a row 1101 contains information relating to link 901. In row 1101, values under columns 1110A uniquely identify interface 931 of NE 930 while values under columns 1110B uniquely identify interface 912 of NE 910. Columns 1120 further contain information relating to a link coupling two circuit switches. In row 1101, values under columns 1120 indicate that the link coupling interface 931 and interface 912 (i.e. link 901) is a working link in an OC-12 BLSR ring having a BLSR ring ID of "0x1". Similarly, rows 1102-1106 contain information relating to links 902-906, respectively. Information contained in table 1100 has been obtained from flooded packets 800. As used in this disclosure, a table includes any form or way of organizing and storing information.

Table 1100 contains a detailed description of network 900's topology. This is advantageous in a circuit switch network because the specific path, including the specific link between network elements, through which data will be transmitted needs to be known in order to setup the circuit.

The contents of table 1100 are updated using OSPF database synchronization mechanisms (e.g. OSPF link state updates). For example, when a link goes down (i.e. malfunctions), a keep alive request packet from an interface coupled to the downed link will not get acknowledged with a keep alive reply packet. The network element that sent the keep alive request packet determines that the link is down and, subsequently, floods an updated packet 800 to account for the downed link. Each packet 800 has a field 836 (FIG. 8) defined in IETF RFC 1583 as an "LS Sequence Number" (pp. 184-186, IETF RFC 1583). In accordance with IETF RFC 1583, field 836 is incremented whenever an updated packet 800 is flooded. The network elements in the network compare the value of field 836 in newly received packets 800 and update their table 1100 if the newly received packet 800 has a higher LS Sequence Number than the previously received packet 800. Changing any information in any of the fields of packet 800 triggers a table 1100 update.

The description of the invention given above is provided for purposes of illustration and is not intended to be limiting. While the method and associated apparatus are illustrated using a SONET network as an example, the invention is not limited to SONET, not limited to SONET derivatives such as Synchronous Digital Hierarchy ("SDH") networks, and also not limited to specific SONET/SDH transport systems. Further, the methods disclosed herein can be performed by a computer running software (i.e. program code) stored in a computer-readable medium. The invention is set forth in the following claims.

What is claimed is:

1. A method for propagating information in a network, the method comprising:
   automatically assigning an index number to an interface of a circuit switch, wherein said circuit switch is configured to be communicatively coupled to a router;
   automatically transmitting said index number using said interface, wherein
      said automatically transmitting said index number using said interface uses a packet routing protocol, and
      said router is configured to communicate using said packet routing protocol; and
   automatically transmitting said index number using at least one additional interface of said circuit switch, wherein
      said automatically transmitting said index number using said at least one additional interface uses said packet routing protocol,
      said interface and said one additional interface are interfaces among a plurality of interfaces of said circuit switch,
      said interface is configured to be coupled to a link,
      said circuit switch is configured to store a table, and
      said table comprises
         an entry indicating said index number,
         an entry indicating a function of said link, and
         an entry indicating a predetermined number of contiguous frames that may be transmitted over said link.

2. The method of claim 1 further comprising automatically transmitting said index number on all enabled interfaces of said circuit switch.

3. The method of claim 1 wherein said interface and said one additional interface conform to a protocol selected from a group consisting of Synchronous Optical Network (SONET) and Synchronous Digital Hierarchy (SDH).

4. The method of claim 1 further comprising:
   storing said index number in said table, wherein
      at least another network element in said network is configured to store said index number in another table.

5. The method of claim 1 wherein
   said at least one additional interface is configured to be coupled to another link,
   said circuit switch is configured to store another table, and
   said another table comprises
      another entry indicating a function of said link, and
      another entry indicating a predetermined number of contiguous frames that may be transmitted over said another link.

6. The method of claim 1, wherein
   said packet routing protocol is one of an Open Shortest Path First (OSPF) protocol and a Routing Information Protocol (RIP).

7. The method of claim 1, wherein
   said link is configured to couple said interface to another interface in another circuit switch.

8. The method of claim 1, wherein said network comprises a plurality of routers and a plurality of circuit switches, said circuit switches comprise said circuit switch, and the method further comprises:
   transmitting said index number from a router of said routers in accordance with said packet routing protocol, wherein
      said transmitting comprises said automatically transmitting said index number using said interface.

9. The method of claim 8, further comprising:
   storing said index number in said table, wherein
      said transmitting transmits a packet from said router to another router of said routers,
      a network element in said network comprises said circuit switch and said router,
      another network element in said network comprises another circuit switch of said circuit switches and said another router, and
      said another network element is configured to store said index number in another table.

10. The method of claim 9, further comprising:
    segmenting said packet into a plurality of units at said network element,
    forming a plurality of frames at said network element, wherein each frame comprises at least one of said units;
    reassembling said plurality of units into said packet at said another network element; and
    storing said index number in said another table.

11. The method of claim 10, wherein
    said link is coupled between said network element and said another network element,
    said table and said another table each comprise information, and said information indicates a predetermined number of contiguous frames that may be transmitted over said link.

12. A network comprising:
a first router;
a first circuit switch comprising a first interface, wherein
said first circuit switch is communicatively coupled to said first router,
said first circuit switch comprises a first plurality of memory locations, and
said first interface having assigned thereto a first identifier;
a second router;
a second circuit switch comprising a second interface, wherein
said second circuit switch is communicatively coupled to said second router,
said second circuit switch comprises a second plurality of memory locations,
said second interface having assigned thereto a second identifier,
said first plurality of memory locations store a first table,
said first table comprises each of said first identifier and said second identifier,
said second plurality of memory locations store a second table, and
said second table comprises each of said first identifier and said second identifier, and
said first circuit switch and said second circuit switch are configured to communicate using a packet routing protocol; and
a link coupling said first interface to said second interface, wherein
said first table and said second table each comprise
an entry indicating a function of said link, and
an entry indicating a predetermined number of contiguous frames that may be transmitted over said link.

13. The network of claim 12 wherein said link comprises a fiber optic cable.

14. The network of claim 12 wherein said first circuit switch and said second circuit switch use a protocol selected from a group consisting of Synchronous Optical Network (SONET) and Synchronous Digital Hierarchy (SDH).

15. A computer program product comprising:
a plurality of instructions, comprising
a first set of instructions, executable on a computer system, configured to automatically assign an index number to an interface of a circuit switch, wherein
said circuit switch is configured to be communicatively coupled to a router,
a second set of instructions, executable on said computer system, configured to automatically transmit said index number on said interface, wherein
said second set of instructions is configured to use a packet routing protocol, and
said router is configured to communicate using said packet routing protocol, and
a third set of instructions, executable on said computer system, configured to automatically transmit said index number on at least one additional interface of said circuit switch, wherein
said computer readable program code for automatically transmitting said index number on said at least one additional interface is configured to use said packet routing protocol,
said interface and said one additional interface are interfaces among a plurality of interfaces of said circuit switch,
said interface is configured to be coupled to a link,
said circuit switch is configured to store a table, and
said table comprises
an entry indicating said index number,
an entry indicating a function of said link, and
an entry indicating a predetermined number of contiguous frames that may be transmitted over said link; and
a computer-readable storage medium, wherein said instructions are encoded in said computer-readable storage medium.

16. The computer program product of claim 15 wherein
said at least one additional interface is configured to be coupled to another link,
said circuit switch is configured to store another table, and
said another table comprises
another entry indicating a function of said link, and
another entry indicating a predetermined number of contiguous frames that may be transmitted over said another link.

17. The computer program product of claim 16, wherein said network comprises a plurality of routers and a plurality of circuit switches, said circuit switches comprise said circuit switch, and said instructions further comprise:
a fourth set of instructions, executable on said computer system, configured to transmit said index number from a router of said routers in accordance with said packet routing protocol.

18. The computer program product of claim 17, wherein said instructions further comprise:
a fifth set of instructions, executable on said computer system, configured to store said index number in said table, wherein
said fourth set of instructions are further configured to cause a packet to be transmitted from said router to another router of said routers,
a network element in said network comprises said circuit switch and said router,
another network element in said network comprises another circuit switch of said circuit switches and said another router, and
said another network element is configured to store said index number in another table.

19. The computer program product of claim 18, wherein said instructions further comprise:
a sixth set of instructions, executable on said computer system, configured to segment said packet into a plurality of units at said network element,
a seventh set of instructions, executable on said computer system, configured to form a plurality of frames at said network element, wherein
each frame comprises at least one of said units;
a eighth set of instructions, executable on said computer system, configured to reassemble said plurality of units into said packet at said another network element; and
a ninth set of instructions, executable on said computer system, configured to store said index number in said another table.

20. The computer program product of claim 19, wherein
said link is coupled between said network element and said another network element,
said table and said another table each comprise information, and
said information indicates a predetermined number of contiguous frames that may be transmitted over said link.

* * * * *

UNITED STATES PATENT AND TRADEMARK OFFICE
CERTIFICATE OF CORRECTION

PATENT NO. : 7,639,665 B1　　　　　　　　　　　　　　　　　　　　　　　Page 1 of 1
APPLICATION NO. : 10/620021
DATED : December 29, 2009
INVENTOR(S) : Huai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Twenty-first Day of December, 2010

David J. Kappos
*Director of the United States Patent and Trademark Office*